United States Patent
Int-Hout, III et al.

(10) Patent No.: US 12,018,856 B2
(45) Date of Patent: Jun. 25, 2024

(54) DUAL INLET AIR DIFFUSER

(71) Applicant: Nailor Industries of Texas, Inc., Houston, TX (US)

(72) Inventors: Daniel Int-Hout, III, Plano, TX (US); Eugene William Michael Faris, Kingwood, TX (US); Steve Nailor, The Woodlands, TX (US)

(73) Assignee: Nailor Industries of Texas, Inc., Houston, TX (US)

( * ) Notice: Subject to any disclaimer, the term of this patent is extended or adjusted under 35 U.S.C. 154(b) by 0 days.

(21) Appl. No.: 17/349,431

(22) Filed: Jun. 16, 2021

(65) Prior Publication Data

US 2022/0042713 A1 Feb. 10, 2022

Related U.S. Application Data

(60) Provisional application No. 63/060,938, filed on Aug. 4, 2020.

(51) Int. Cl.
*F24F 13/062* (2006.01)
*F24F 11/74* (2018.01)
*F24F 13/10* (2006.01)

(52) U.S. Cl.
CPC ............ *F24F 13/062* (2013.01); *F24F 11/74* (2018.01); *F24F 13/10* (2013.01)

(58) Field of Classification Search
CPC .. F24F 13/06; F24F 2013/0616; F24F 13/062; F24F 13/04; F24F 3/052; F24F 1/0047; F24F 1/01; F24F 11/74; F24F 2007/001; F24F 13/10; F24F 3/0527
See application file for complete search history.

(56) References Cited

U.S. PATENT DOCUMENTS 5,768,121 A * 6/1998 Federspiel ........... G05B 13/024
   700/28
10,502,449 B2 * 12/2019 Kimura .................... F24F 11/74
(Continued)

FOREIGN PATENT DOCUMENTS

EP    1496318 A2 *  1/2005  .............. F24F 13/06
JP    H10267374 A * 10/1998
JP    5809609 B2 * 11/2015

OTHER PUBLICATIONS

English translation of JP-5809609-B2 dated Aug. 3, 2022 (Year: 2022).*

(Continued)

*Primary Examiner* — Edelmira Bosques
*Assistant Examiner* — Brett Peterson Mallon
(74) *Attorney, Agent, or Firm* — Kilpatrick Townsend & Stockton LLP

(57) ABSTRACT

Dual inlet air diffuser for a heating ventilation and air conditioning (HVAC) system. The dual inlet air diffuser mixes two or more separate and/or distinct air streams into a homogenous or nearly homogenous mixture of air. The two or more separate air streams may have different temperatures and/or different humidity levels, and/or may be from different sources, such as having one air stream comprising ventilation air that includes filtered air from an outside, ambient air source and a second conditioned air stream from a heating, air conditioning, or other air treatment unit.

20 Claims, 10 Drawing Sheets

(56) References Cited

U.S. PATENT DOCUMENTS

2016/0305677 A1* 10/2016 Hirsch ................ F24F 11/0001
2018/0283705 A1* 10/2018 Handsaker ............. F24F 3/056

OTHER PUBLICATIONS

English translation of JP-H10267374-A dated Aug. 3, 2022 (Year: 2022).*
English translation of dated EP-1496318-A2 Aug. 3, 2022 (Year: 2022).*

* cited by examiner

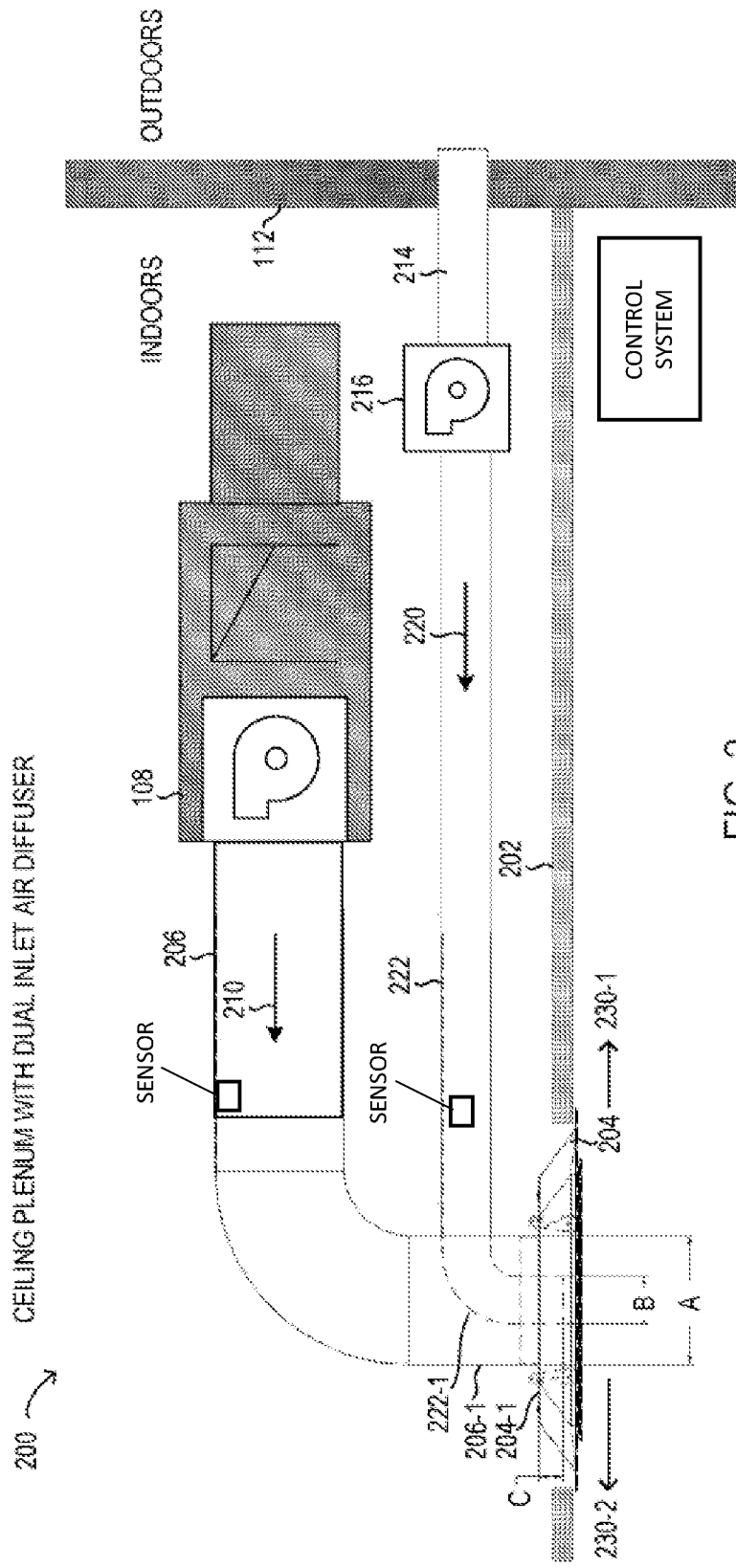

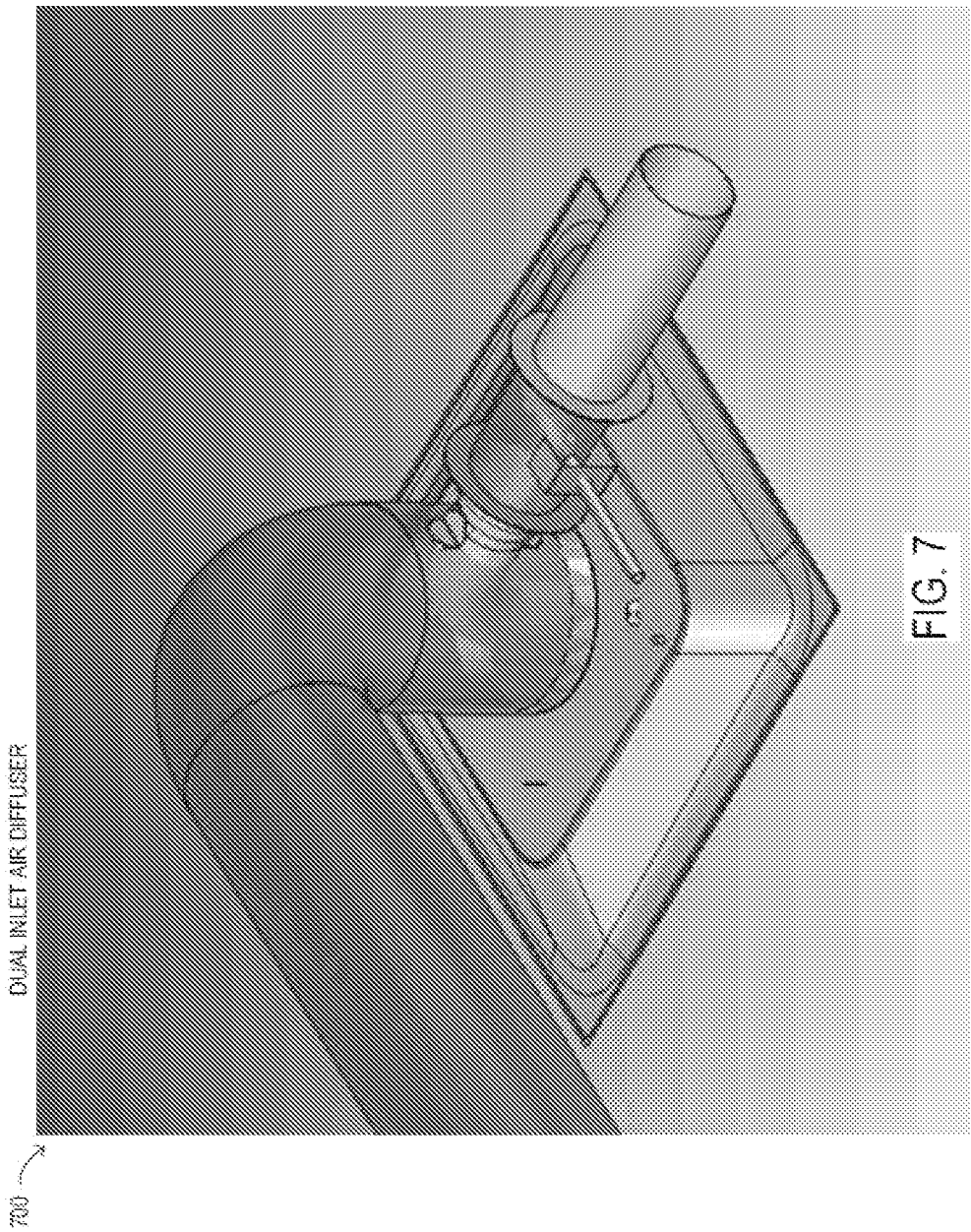

DUAL INLET AIR DIFFUSER

CROSS-REFERENCE TO RELATED APPLICATIONS

This application claims the benefit of and priority to U.S. Patent Application No. 63/060,938, filed Aug. 4, 2020, the content of which is incorporated herein by this reference.

BACKGROUND

Field of the Disclosure

The present disclosure relates generally to heating, ventilation, and air-conditioning (HVAC) systems. In particular, a dual inlet air diffuser for an HVAC system is disclosed.

Description of the Related Art

HVAC systems are used to acclimatize the interior environment in closed spaces occupied by persons, such as in buildings and rooms. HVAC systems typically include an air handler to provide circulating air that is used to condition the interior climate of the buildings or rooms. The air handler may include various elements such as heat transfer elements, air filters, humidifiers, air blowers, dampers, and other devices. HVAC systems are typically designed for a specified performance rating, such as for providing a specified volumetric flow of air within the closed spaces.

As HVAC systems are designed and specified for increased efficiency, energy consumption, and comfort, certain new regulations or energy codes may mandate that occupied buildings shall provide ventilation air by a dedicated ventilation air system. In some cases, the ventilation air system may be mandated to provide 100% of the building's HVAC air flow needs without requiring operation of the heating system fan and the cooling system fans for air delivery within the occupied spaces.

BRIEF DESCRIPTION OF THE DRAWINGS

For a more complete understanding of the present invention and its features and advantages, reference is now made to the following description, taken in conjunction with the accompanying drawings, in which:

FIG. 2 is a depiction of a ceiling plenum with a dual inlet air diffuser;

FIG. 7 is a depiction of a dual inlet air diffuser in a perspective view; and

DESCRIPTION OF PARTICULAR EMBODIMENT(S)

Figure 1A:
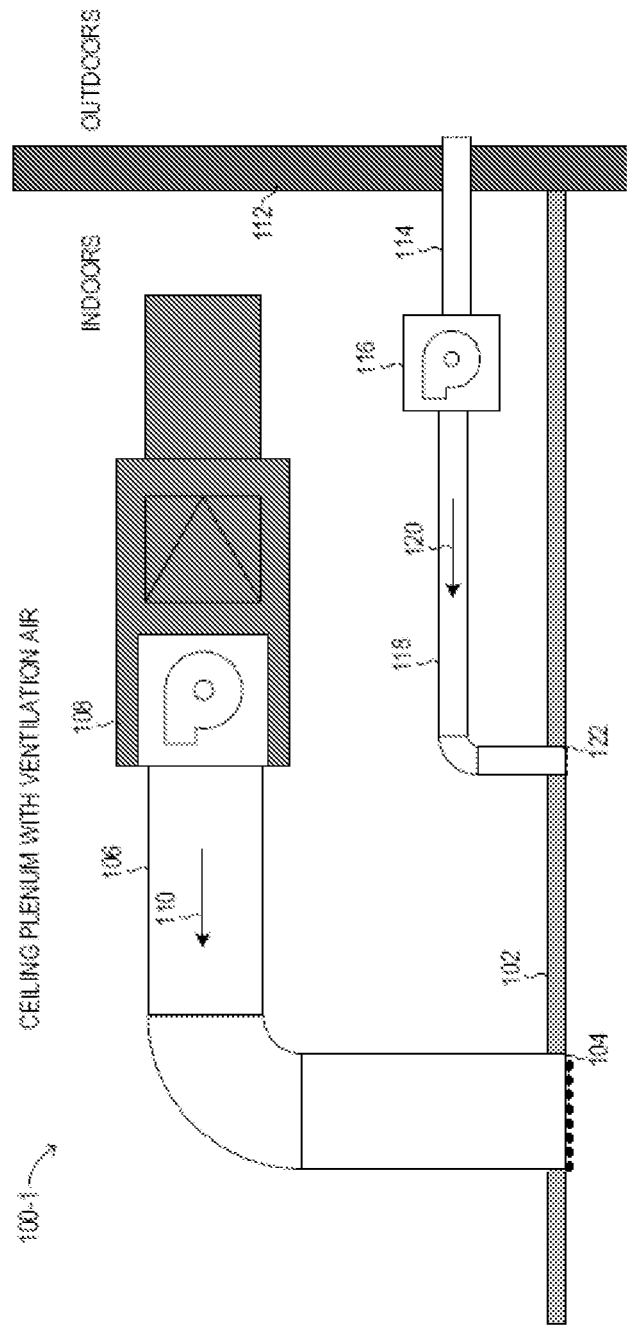
FIG. 1A is a prior art depiction of a ceiling plenum with ventilation air.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

As noted above, as energy efficiency of HVAC systems increases, certain new regulations or energy codes may mandate that occupied buildings shall provide ventilation air by a dedicated ventilation air system. In some cases, the ventilation air system may be mandated to provide 100% of the air flow needs without requiring operation of the heating system fan and the cooling system fans for air delivery within the occupied spaces.

As disclosed herein, a dual inlet air diffuser may be enabled to provide 100% ventilation air directly from the outside to an occupied space, and may further be enabled to provide conditioned air from an HVAC system. It should be understood that "ventilation air" includes air that has been filtered, such as air from outside a building that has been filtered through a filter such as a HEPA or MERV 13 filter. Ventilation air should be understood to include air that has been heavily filtered (e.g., with a MERV 13 or higher rating filter), as well as air from outside that has been filtered to a lesser extent (e.g., with a MERV 8 or 11 filter). Generally, the term "ventilation air" is useful to distinguish such air from "conditioned air," which may be understood as the air that is being circulated and re-circulated in a building through the HVAC system(s). The dual inlet air diffuser disclosed herein may be enabled to mix the ventilation air with the conditioned air upon and then discharge the mixed air into the occupied space, which is desirable for optimum energy efficiency and precise control of the ventilation air. The dual inlet air diffuser disclosed herein may provide comfort to the occupied space by discharging the mixed air in a horizontal direction from a ceiling duct. The dual inlet air diffuser disclosed herein may release the ventilation air at a lower level within a mixing body of the dual inlet air diffuser to prevent undesirable backflow and potentially unwanted condensation in the HVAC system. The dual inlet air diffuser disclosed herein may include a ventilation flow control element, such as a damper, to enable modulation of the ventilation air flow into the dual inlet air diffuser. The ventilation flow control element in the dual inlet air diffuser disclosed herein may enable precise control of the amount of ventilation air mixed with the conditioned air at an air outlet of the HVAC system. The dual inlet air diffuser disclosed herein may eliminate a second air outlet for ventilation into the occupied space and may enable avoiding unwanted poor mixing of the conditioned air and the ventilation air in the occupied space, which may decrease comfort in the occupied space. The dual inlet air diffuser disclosed herein may enable effective mixing of the ventilation air and the conditioned air at different temperatures and may provide a horizontal discharge direction for the mixed air from the dual inlet air diffuser. The dual inlet air system of the present disclosure may be controlled manually or automatically, such as by a computer control system. In addition, the dual inlet air system of the present disclosure may be adjusted by a control system due to changes in the exhaust air flow of a space.

Referring now to the drawings, FIG. 1A is a prior art depiction of a ceiling plenum 100-1 that may be present in a typical building, such as free space above a ceiling 102 of an occupied space. It is noted that FIG. 1A is a schematic illustration and is not necessarily drawn to scale or perspective. As shown in FIG. 1A, ceiling plenum may provide access to an external wall 112 that separates outdoors from indoors. In ceiling plenum 100, an air handler 108 represents various components of an HVAC system that provides conditioned air via a supply air duct 106 in a direction given by arrow 110, for example. Supply air duct 106 terminates at an opposing end that is shown covered with a grille 104 from which the outlet air emerges. Also shown in FIG. 1A is a ventilation inlet 114 from which a ventilation blower 116 may draw in ventilation air from the outdoors. Ventilation blower 116 may force the ventilation air through a ventilation air duct 118 in a direction given by arrow 120 into the occupied space through a ventilation grille 122. Thus, in the prior art arrangement of ceiling plenum 100-1, two grilles and two outlets into the occupied space are used, which is undesirable. Furthermore, in ceiling plenum 100-1, the ventilation air and the conditioned air are not mixed before entering the occupied space, and are delivered separately, which is undesirable because of the resulting poor comfort due to inhomogeneous air in the occupied space, along with air flow sources having different temperatures.

Figure 1B:
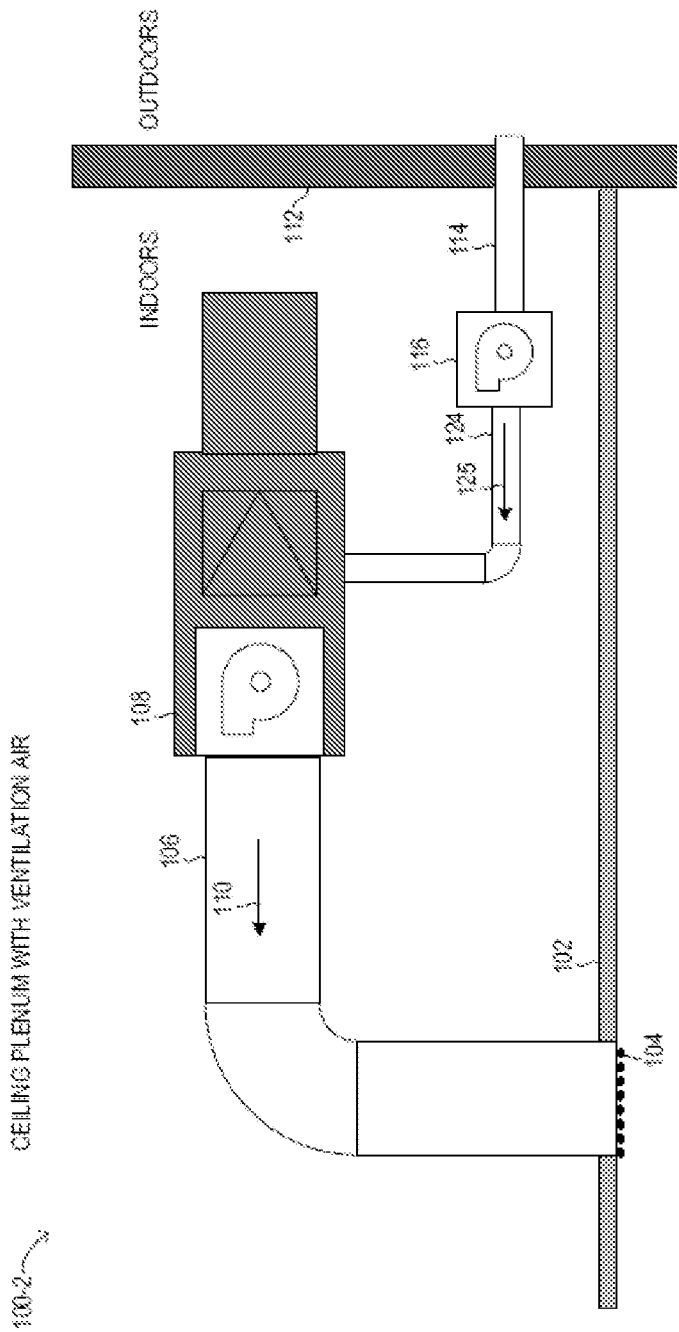
FIG. 1B is a prior art depiction of a ceiling plenum with ventilation air.

In FIG. 1B, a further prior art depiction of a ceiling plenum 100-2 is depicted. In ceiling plenum 100-2, ventilation blower 116 sends the ventilation air through a ventilation air duct 124 in a direction given by arrow 125. In ceiling plenum 100-2, ventilation air duct 124 is in fluid communication with air handler 108 upstream of the fan, which mixes the ventilation air with the conditioned air. In contrast to ceiling plenum 100-1 of FIG. 1A, the arrangement shown in ceiling plenum 100-2 of FIG. 1B does eliminate a second grille and air outlet into the occupied space below ceiling 102. The system shown in FIG. 1B can in theory deliver a mixture of conditioned air and ventilation air, but the same mixture in such a system is delivered to all of the occupied spaces. Thus, this system may not be suitable if the air handler 108 is to serve multiple occupied spaces, especially if each of the spaces has individual and differing needs for the percentage of ventilation air. For example, in a particular building, there may be several different occupants with different uses, such as residential, office space, and commercial space. If a given system like that shown in FIG. 1B is used, and if each different occupant requires a different particular minimum percentage of ventilation air to conditioned air, it can be seen that the system of FIG. 1B will need to be operated at a level providing each space with the percentage of ventilation air that corresponds to the highest minimum percentage applicable to any of the three different uses. As a result, the arrangement shown in ceiling plenum 100-2 may not meet certain energy codes and may not enable optimum efficiency of the HVAC system using the ventilation air, because the regulation of the air supply provided directly to each occupied space is not possible.

In FIG. 2, a ceiling plenum 200 with a dual inlet air diffuser 204, as disclosed herein, is depicted. It is noted that FIG. 2 is a schematic illustration and is not necessarily drawn to scale or perspective. In ceiling plenum 200, an air handler 208 includes, among other elements, a supply air duct 206 that is in fluid communication with air handler 208 to enable conditioned air to be provided the occupied space below ceiling 102 via dual inlet air diffuser 204, which represents an endpoint of the HVAC system, in a direction given by arrow 210. Also shown in ceiling plenum 200 is a ventilation inlet 214 from which a ventilation blower 216 may draw in ventilation air from the outdoors. Ventilation blower 216 may force the ventilation air through a ventilation air duct 222 in a direction given by arrow 220 into the occupied space through dual inlet air diffuser 204, as shown.

Accordingly, dual inlet air diffuser 204 may have a first supply duct 206-1 for the conditioned air from air handler 208, as well as a second supply duct 222-1 for the ventilation air from ventilation air duct 222. As shown, first supply duct 206-1 may have a diameter given by A, while second supply duct 222-1 may have a diameter given by B, which is smaller than A. Since second supply duct 222-1 is smaller in diameter than first supply duct 206-1, second supply duct 222-1 is routed through an opening in first supply duct 206-1 and then bends downward at an interior portion of dual inlet air diffuser 204, where second supply duct 222-1 is arranged concentrically to first supply duct 206-1. In this concentric arrangement, first supply duct 206-1 and second supply duct 222-1 are in fluid communication with a mixing box 204-1 that is formed within dual inlet air diffuser 204 as an open space. Specifically, both first supply duct 206-1 and second supply duct 222-1 terminate within mixing box 204-1, which provides a volume for homogenization of the ventilation air mixed with the conditioned air, before the mixed air emerges horizontally and in a radial manner, as shown by arrows 230-1 and 230-2, from dual inlet air diffuser 204 into the occupied space. It is further noted that second supply duct 222-1 extends further into mixing box 204-1 than first supply duct 206-1, which is given by a distance C in FIG. 2. Because second supply duct 222-1 has a discharge level that is lower than first supply duct 206-1, backflow into second supply duct 222-1 (i.e., the ventilation system) is prevented by the expanding low pressure region of the conditioned air from first supply duct 206-1, even when the pressure at first supply duct 206-1 is greater than at second supply duct 222-1. As shown in ceiling plenum 200, dual inlet air diffuser 204 may be used with second supply duct 222-1 and ventilation air duct 222 having the same diameter.

Referring to FIGS. 3-7, it can be seen that the diffuser 204-1 and 404 can be shaped in a generally pyramid shape having a frustum, such as a square frustum, on a top end, with the corners rounded. It should be noted that the diffuser 204-1 and 404 can have different shapes, such as a frusto-conical shape, and can have varying heights, lengths, and widths. Moreover, it is possible to use different shapes for different diffusers for the same or different occupied spaces if desired.

The partial pyramidal or conical shape of the diffuser is useful for mixing the conditioned air and the ventilation air. In many situations, it is anticipated that the conditioned air will be warmer or cooler than the ventilation air; i.e., the ventilation air will be at a different temperature than the conditioned air. In addition, and in many situations, the ventilated air will have a different humidity than the conditioned air. Experience teaches that two streams of air with different temperatures and/or different humidity will not automatically or spontaneously mix with one another. The diffuser's shape (e.g., the expanding interior area of the diffuser from a top to the bottom where the vent is located) means that the conditioned air moves through the an expanding volume as it moves through the diffuser from the duct 206 to the vent. This decreases the pressure of the conditioned air and helps blend the ventilation air with the conditioned air so that the resulting combination is a sufficiently homogenous blending of the conditioned air and the ventilation air that a person feeling the air from the vent would not feel or notice any temperature, humidity, or other difference in air flow. This helps maximize the comfort of the people in the space receiving the mixture of the conditioned air and the ventilation air, such as by avoiding spots within the occupied space that are excessively cold or warm. Ideally, a given space would have a relatively uniform temperature and humidity level throughout (absent effects from radiant or local heat sources like ovens). We believe that excellent mixing of the conditioned air and the ventilation air can be achieved if the conditioned air duct 206 ends at or near the top of the diffuser 204-1 and the ventilation air duct 222 ends between the end of the air duct 206 and the bottom of the diffuser 204-1. Different ceiling and space configurations of the occupied space will involve different space considerations for the ducts 206 and 222 and the diffuser 204-1, but in general we would expect the bottom of the duct 222 within the diffuser 204-1 to be about an inch or more above the bottom of ceiling 202 to achieve excellent mixing results.

It is noted that ceiling plenums 100 and 200, respectively shown in FIGS. 1 and 2, are exemplary embodiments for descriptive purposes and do not limit any application of dual inlet air diffuser 204 to a particular arrangement or HVAC system design. For example, in various embodiments, dual inlet air diffuser 204 may be used in different portions of a building or HVAC system.

It is further noted that in some implementations, ceiling 102 may not be present and dual inlet air diffuser 204 may supply mixed conditioned air and ventilation air directly to an open space below.

Figure 3:
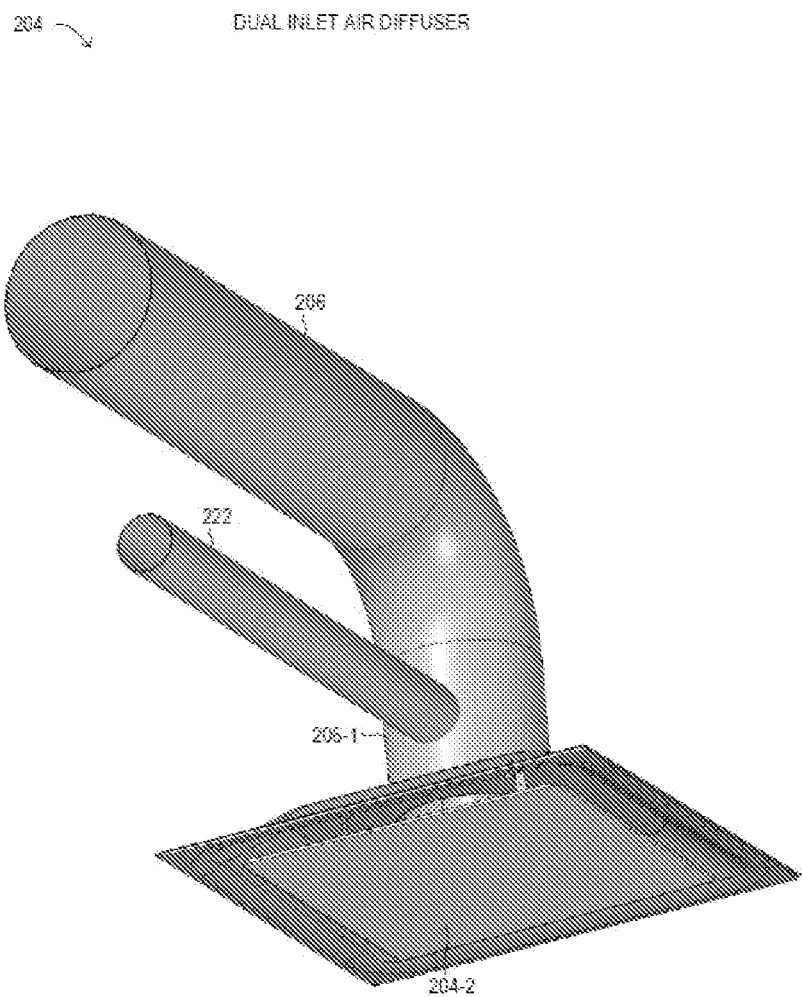
FIG. 3 is a depiction of a dual inlet air diffuser in a perspective view from below.

Referring now to FIG. 3, a lower perspective and detail view of dual inlet air diffuser 204 is depicted. It is noted that FIG. 3 is a schematic illustration and is not necessarily drawn to scale or perspective. As shown in FIG. 3, dual inlet air diffuser 204 may be fabricated using sheet metal, for example. Visible in FIG. 3 is a plate 204-2 that covers a lower opening of mixing box 204-1 of dual inlet air diffuser 204 and enables the horizontal discharge of the mixed air. In practice there are multiple different faces that may be used for the discharge of the diffuser, such as those that use louvers and/or vanes. The solid plate 204-2 shown is the most popular for conventional HVAC systems and is therefore shown for reference. It is noted that the view from below represents the appearance of dual inlet air diffuser 204 when installed in ceiling 102, for example.

Figure 4:
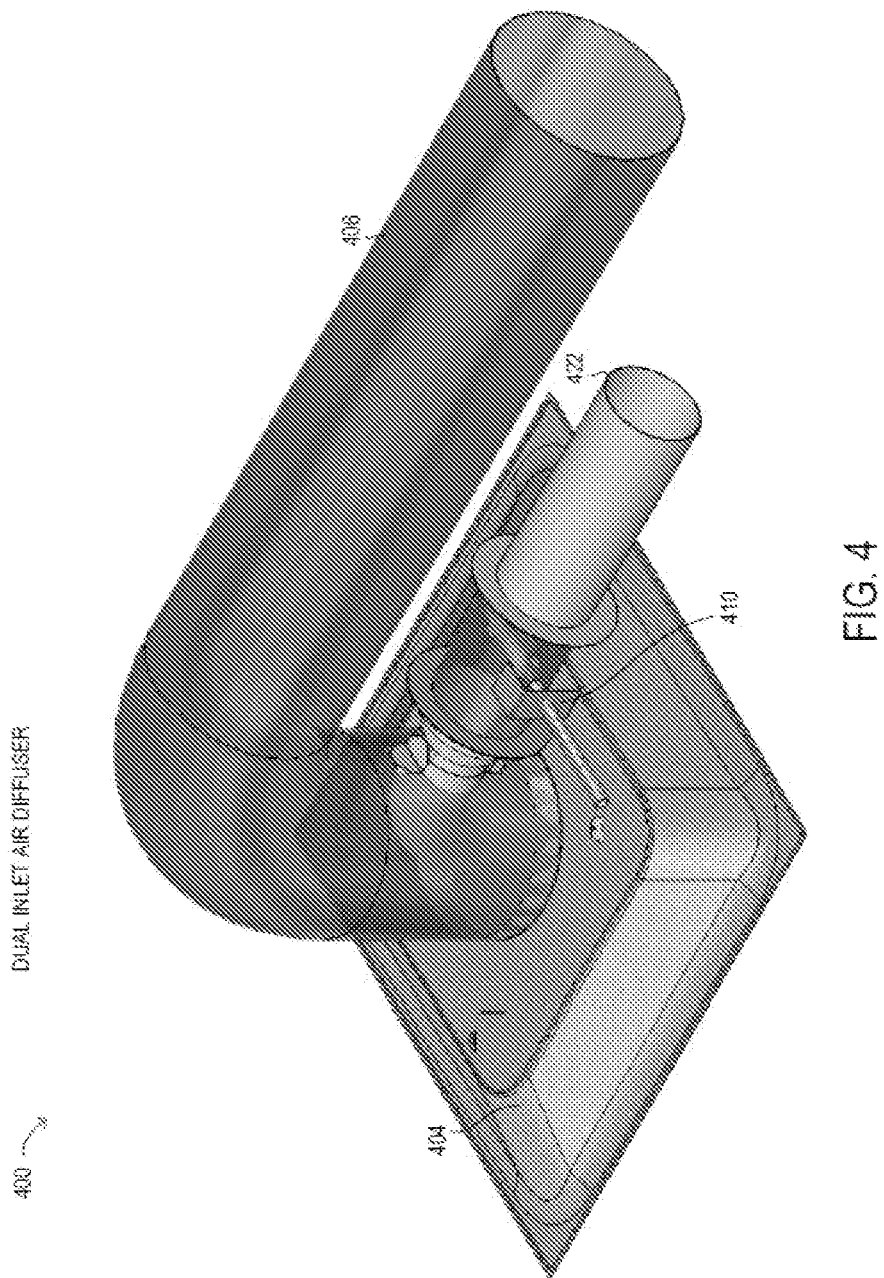
FIG. 4 is a depiction of a dual inlet air diffuser in a perspective view.
Figure 5:
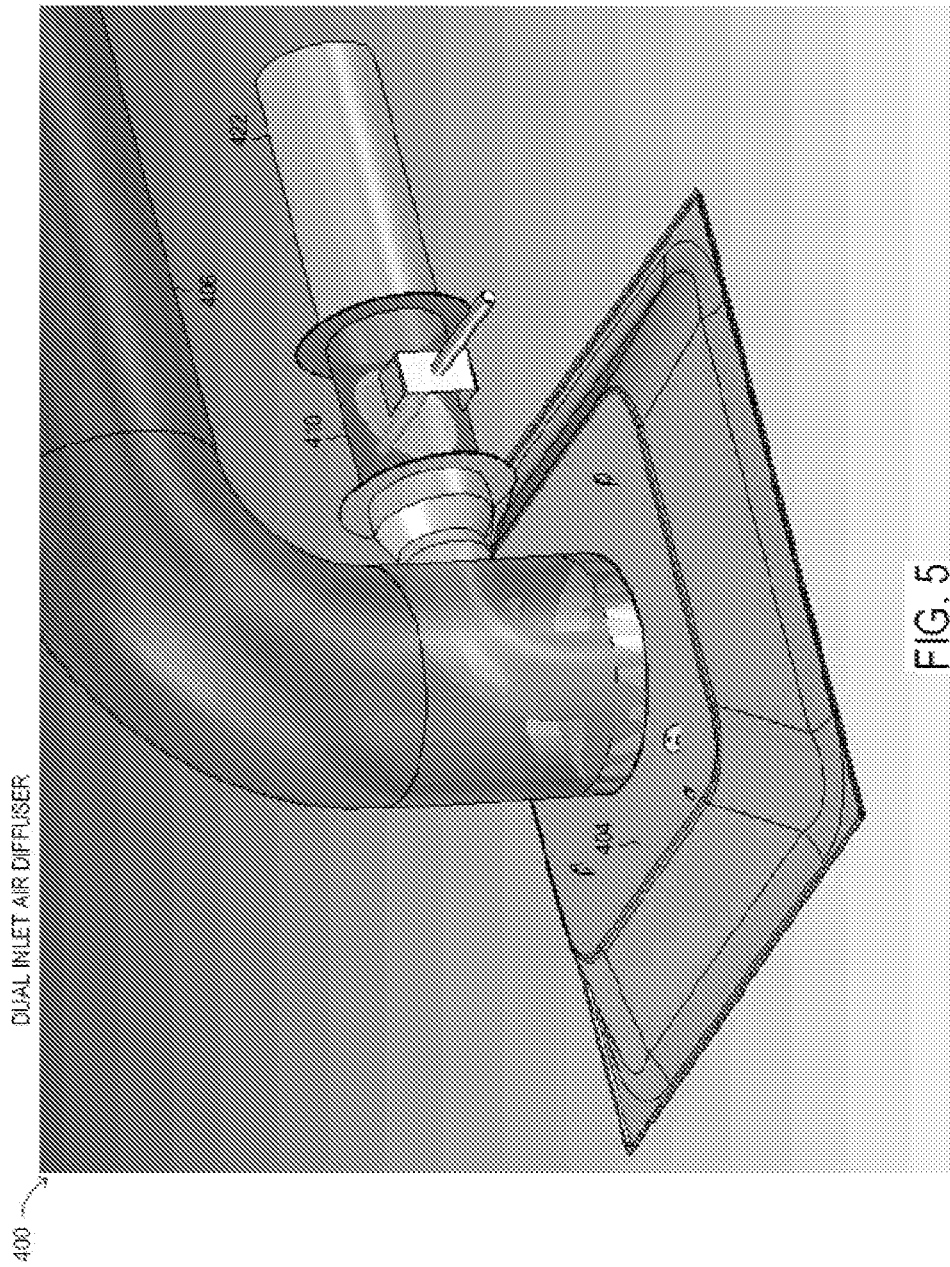
FIG. 5 is a depiction of a dual inlet air diffuser in a perspective view.

Referring now to FIG. 4, a perspective and detail view of a dual inlet air diffuser 400 is depicted. It is noted that FIG. 4 is a schematic illustration and is not necessarily drawn to scale or perspective. As shown, dual inlet air diffuser 400 may be substantially similar to dual inlet air diffuser 204 shown and described above. Specifically, dual inlet air diffuser 400 includes a first supply duct 406 and a second supply duct 422, as well as mixing box 404. In addition, dual inlet air diffuser 400 is shown with a ventilation flow control element 410 that may enable control of the flow of the ventilation air supplied to dual inlet air diffuser 400. Ventilation flow control element 410 may include a damper at an interior portion of second supply duct 422 that can be adjusted to modulate a flow area within second supply duct 422. In some implementation, ventilation flow control element 410 may be enabled for manual operation. In other implementations, ventilation flow control element 410 may be enabled for servo-operation, such as by using a motor (not shown) to adjust an angle of the damper. It is noted that the motor or other control element may be integrated into the HVAC system and may be used for precise control of the climatized air supplied to the occupied space, by enabling precise control of the amount of ventilation air mixed with the conditioned air. Furthermore, as second supply duct 422 penetrates a wall of first supply duct 406, a diameter of second supply duct 422 may be reduced, as shown in FIG. 4. For example, a larger diameter may be used externally to dual inlet air diffuser 400 to enable compatibility with common conduit or flexible hose sizes typically available on the market. In FIG. 5, another view of dual inlet air diffuser 400 in a semi-transparent depiction shows ventilation flow control element 410 as well as the reduction in diameter of second supply duct 422.

Figure 6:
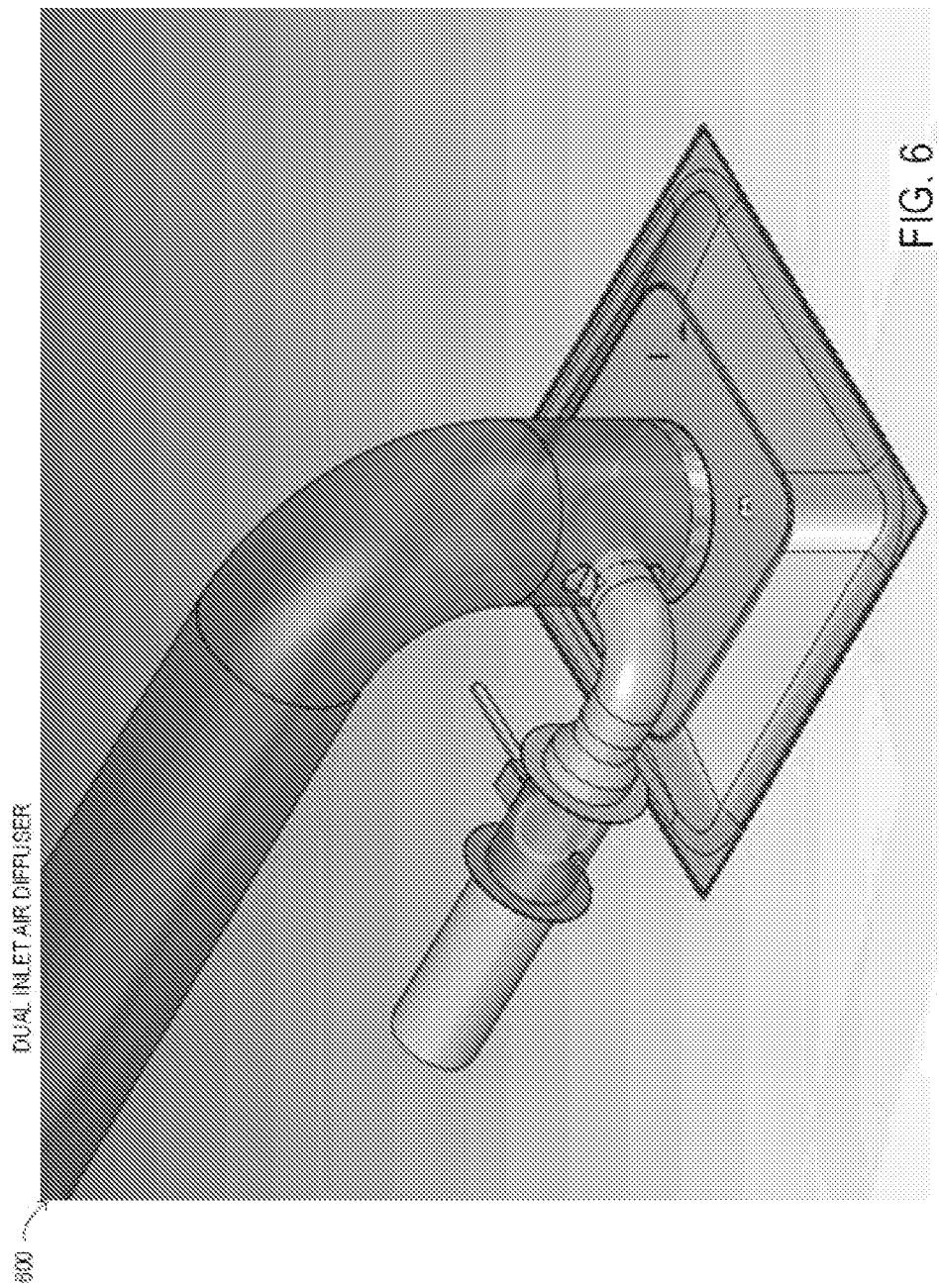
FIG. 6 is a depiction of a dual inlet air diffuser in a perspective view.

In FIG. 6, a dual inlet air diffuser 600 is shown having yet another embodiment, with a different arrangement of the direction of the first supply duct and the second supply duct, specifically with an additional horizontal elbow within the second supply duct. It is noted that dual inlet air diffuser 600 may be used with or without (not shown) a ventilation flow control element.

In FIG. 7, a dual inlet air diffuser 700 is shown having yet another embodiment, with a different arrangement of the direction of the first supply duct and the second supply duct, specifically at 90 degrees to each other. It is noted that dual inlet air diffuser 600 may be used with or without (not shown) a ventilation flow control element.

As shown in part in FIGS. 6 and 7, various different implementations of the dual inlet air diffuser disclosed herein may be used. For example, an angle between the first supply duct and the second supply duct may vary to any radial value. In some instances, a conditioned air flow control element may be used to modulate the conditioned air in the first supply duct. In some embodiments, the second supply duct can be used to regulate ventilation air for an exhaust line, such as a bathroom exhaust riser in a tall building.

It should be noted that the diffusers of the present disclosure provide a dual inlet diffuser that attains a near homogenous air mixture of two different airstreams, each having a different air temperature and a humidity level, and as noted herein, the diffuser may be attached to an exhaust riser in an HVAC system in a building that is adapted for manually or automatically adjusting the exhaust flow from an occupied space in the building into the exhaust riser. In addition, the two different airstreams that are provided to a dual inlet diffuser of the present disclosure may comprise a first airstream comprising ventilation air and a second airstream comprising conditioned air. The ventilation air may comprise filtered air.

It should also be noted that the present disclosure includes a kit for providing ventilation air to an interior space of a building, wherein the kit may comprise a first inlet duct for providing conditioned air to an interior space, the first inlet duct having a first internal cross-sectional area, a second inlet duct for providing ventilation air to the interior space, the second inlet duct having a second internal cross-sectional area, wherein the first inlet duct has a portion adapted to receive a portion of the second inlet duct therethrough, and a diffuser adapted to receive a terminal portion of the first inlet duct proximal a first side of the diffuser, and wherein the terminal portion of the second inlet duct extends within and out of the terminal portion of the first inlet duct, with the terminal portion of the first inlet duct and the second inlet duct located within the diffuser, and wherein the diffuser defines an interior cross-sectional area that increases from the first side of the diffuser to the second side of the diffuser. The kit may further have one of the first inlet duct and the second inlet duct having a portion defining a circular cross-section, a rectangular cross-section, and wherein the diffuser may comprise a pyramidal shaped portion, a conical shaped portion, and/or a frusto-conical shaped portion.

As noted above, the dual inlet systems described above can be controlled manually and/or automatically, such as by a computerized control system. Such a system may have appropriate sensors in the occupied spaces, as well as outside the building and/or within the ducts 222 and 206, with such sensors coupled to the control system and the system may be programmed so that the mixture of conditioned air and ventilation air is automatically adjusted to achieve a desired mix and to maintain a desired temperature or temperature range and/or desired humidity level or humidity range. In addition, the system can be programmed so that it provides a particular mix of conditioned air and ventilation air during some time periods and one or more different mixtures at one or more different time periods. For example, it might be that a desired first mixture should be maintained for an occupied space during office hours, but that mixture need not be maintained after hours or on weekends. In addition, the system may be programmed so that a first mixture of conditioned air and ventilation air is provided to a first occupied space in a building (or a first set of occupied spaces), while one or more other spaces or sets of spaces receives different mixtures of conditioned air and ventilated air than the first mixture. For example, it may be that a mix of ventilation air with conditioned air is not even necessary for one or more vacant spaces in a building, while a first occupied space should be supplied with a first mixture and a second occupied space should be supplied with a second mixture. In this simple example, the system may be programmed to provide at least three different mixtures of conditioned air and ventilation air to the three different spaces.

Figure 8A:
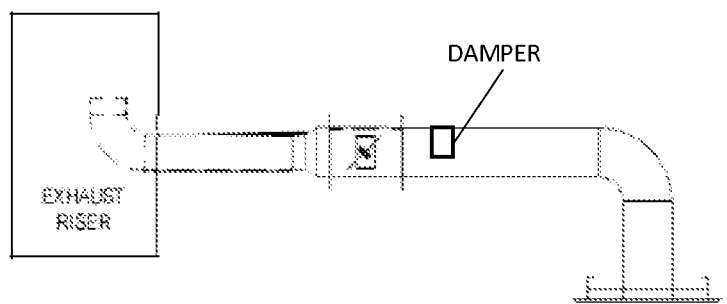
FIGS. 8A and 8B are schematic diagrams of exhaust air flow systems.
Figure 8B:
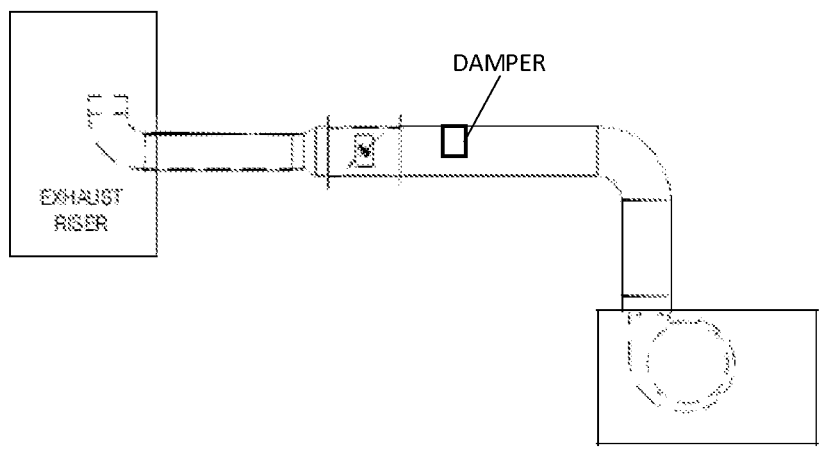
Figure 9:
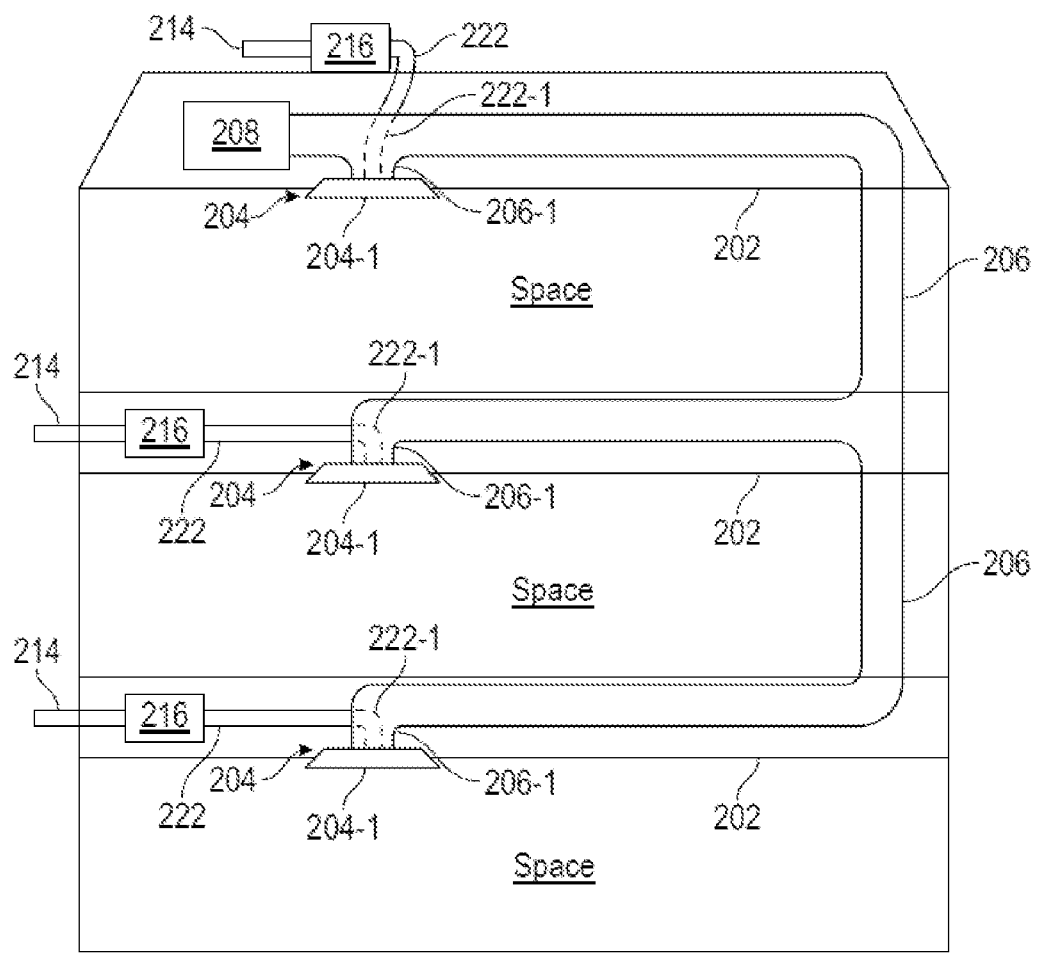
FIG. 9 is a schematic view of a plurality of dual inlet air diffusers positioned at a variety of spaces.

The control system also may be programmed to monitor the exhaust air from a space and to adjust the flow of the conditioned air and/or the ventilation air as appropriate. FIGS. 8A and 8B provide schematic diagrams of systems for providing exhaust air from an occupied space (FIG. 8A) or a remote collecting unit with a fan (FIG. 8B). In each case shown in FIGS. 8A and 8B, a duct carries the exhaust air to an exhaust riser. The duct may have a manifold to control the air flow, and the manifold may be controlled automatically, such as by the computerized system noted above, and/or manually if desired. In addition, the ducts are shown leading into the exhaust risers, where the duct terminates with an upturned terminal, thereby directing the exhaust air from the duct in an upward vertical direction. This configuration helps provide a chimney effect so that the exhaust air continues up the exhaust riser once it leaves the end of the duct shown in FIGS. 8A and 8B.

Appropriate sensors coupled to the control system may be used so monitor and measure the amount of exhaust air flowing from each given occupied space and/or from each given exhaust duct when a given space has multiple exhaust exits. For example, an apartment unit might have an exhaust for a kitchen and a separate exhaust for a bathroom. A large ballroom might have multiple exists for exhaust air throughout the ballroom. By monitoring the flow of the exhaust air for each of such exits, the control system can determine when a threshold is reached such that the amount of air supplied to a given space should be increased or decreased.

For example, it may be that a positive air pressure is desired for one or more given spaces so that outside air from the street level does not enter a residential apartment or office. If the flow of exhaust air is increased from such a space, the positive pressure might not be maintained. However, the control system can determine if the exhaust air flow increases and by how much, and can then increase the flow of either or both the conditioned air and the ventilation air as desired or needed to maintain positive pressure within the space. In addition, or in the alternative, the control system may be programmed to adjust one or more dampers in the one or more exhaust ducts, and thereby adjust the amount of exhaust air flow from a given space.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An HVAC system, the HVAC system comprising:
an air inlet to an HVAC system, wherein the inlet provides the HVAC system with ventilation air comprising filtered air, wherein the ventilation air has a first temperature and a first humidity; and
a plurality of diffusers to provide air to a plurality of distinct spaces inside a building, wherein the plurality of diffusers includes:
 a first duct adapted to provide the ventilation air to one of the plurality of distinct spaces, and having a first diameter and a first terminal end; and
 a second duct adapted to provide conditioned air that has been heated or cooled and having a second diameter and a second terminal end, wherein the conditioned air has a second temperature and a second humidity, and wherein the first temperature differs from the second temperature or the first humidity differs from the second humidity;
wherein the first diameter of the first duct is smaller than the second diameter of the second duct, wherein the first duct extends through an opening in the second duct and bends downwardly to extend concentrically within the second duct, and wherein the terminal ends of the first duct and the second duct are located within a mixing box adapted to blend the ventilation air and the conditioned air and provide a homogenous blend of the ventilation air and the conditioned air, to one of the distinct spaces, and wherein the second terminal end of the second duct is located proximal a top of the mixing box and the first terminal end of the first duct is located between the second terminal end and at least an inch above a bottom of the mixing box to thereby prevent backflow,
wherein the mixing box defines an expanding cross-sectional area from the top thereof and includes a lower opening which is at least partially covered by a plate,
wherein each diffuser of the plurality of diffusers is configured to emit the homogenous air into each space of the plurality of spaces in a horizontal and radial manner, and wherein the first duct further includes a third diameter before extending into the opening of the second duct, wherein the third diameter is larger than the first diameter.

2. The HVAC system according to claim 1, wherein the diffuser defines an expanding cross-sectional area from a top portion to a bottom portion.

3. The HVAC system according to claim 2, wherein the HVAC system further comprises a control system comprising a processor, a memory coupled to the processor, and the memory comprises instructions executable by the processor to perform the following steps:
   receive data from one or more sensors regarding a flow rate of the ventilation air and a flow rate of the air that has been heated or cooled;
   responsive to the flow rate data, determine if a mixture of the ventilation air and the conditioned air that has been heated and cooled falls within a target range, falls below a minimum threshold therefor, exceeds a maximum threshold therefor, and/or falls outside a target range therefor; and
   responsive to the determination, sends one or more control signals to one or more fans and/or dampers to adjust the flow of the ventilation air and/or the heated or cooled air to an interior space of interest.

4. The HVAC system according to claim 3 further comprising one or more exhaust ducts connecting one or more interior spaces to an exhaust riser.

5. The HVAC system according to claim 4, wherein a portion of one of the exhausts ducts extends into the exhaust riser and has a terminal portion that extends upwardly.

6. The HVAC system according to claim 5, wherein the instructions further comprise instructions for:
   monitoring a flow of exhaust air from the interior space;
   responsive to the flow rate of the exhaust air, determine if an air pressure of the interior space falls within a target range, falls below a minimum threshold therefor, exceeds a maximum threshold therefor, and/or falls outside a target range therefor; and
   responsive to the determination, sends one or more control signals to one or more fans and/or dampers to adjust the flow of the ventilation air and/or the heated or cooled air to the interior space of interest, and/or sends one or more control signals to a damper in the one or more exhaust ducts to control the flow of the exhaust air, thereby maintaining a desired air pressure within the interior space.

7. An HVAC system, the HVAC system comprising:
   An air inlet to an HVAC system, wherein the inlet provides the HVAC system with ventilation air comprising filtered air, wherein the ventilation air has a first temperature and a first humidity;
   a singular air handler configured to provide conditioned air;
   a plurality of diffusers to provide air to a plurality of distinct spaces inside a building, wherein each of the plurality of diffusers includes:
      a first duct adapted to provide the ventilation air and having a first terminal end; and
      a second duct adapted to provide conditioned air that has been heated or cooled by the singular air handler and having a second terminal end, wherein the conditioned air has a second temperature and a second humidity, and wherein the first temperature differs from the second temperature and the first humidity differs from the second humidity;
      wherein the first terminal end of the first duct is located closer to a vent adapted to provide a mix of the ventilation air and the conditioned air to one of the distinct spaces than the second terminal end of the second duct, and
   a control system configured to provide a first distinct space of the plurality of distinct spaces with a first mixture of ventilation air and conditioned air via a first diffuser of the plurality of diffusers and a second distinct space of the plurality of distinct spaces with a second mixture of ventilation air and conditioned air via a second diffuser of the plurality of diffusers simultaneously,
   wherein the first mixture of ventilation air and conditioned air provided to the first distinct space via the first diffuser of the plurality of differs and the second mixture of ventilation air and conditioned air provided to the second distinct space via the second diffuser of the plurality of diffusers comprise different ratios of ventilation air and conditioned air.

8. The HVAC system of claim 7, wherein the control system is configured to control the first mixture of ventilation air and conditioned air by adjusting a flow rate of the ventilation air and/or a flow rate of conditioned air.

9. The HVAC system of claim 8, wherein the control system is configured to adjust the first mixture and/or the second mixture to maintain a desired temperature or temperature range and/or maintain a desired humidity level or humidity range.

10. The HVAC system of claim 7, wherein the control system is further configured to provide a third mixture of ventilation air and conditioned air to a third distinct space of the plurality of distinct spaces, wherein the third mixture of ventilation air and conditioned air comprises a different ratio of ventilation air and conditioned air than the first mixture and the second mixture.

11. The HVAC system of claim 7, wherein the first mixture includes a temperature and a humidity that is homogenous.

12. The HVAC system of claim 7, wherein the control system is configured adjust the first mixture and/or the second mixture based on one or more period of times.

13. The HVAC system of claim 7 further comprising an exhaust duct, wherein the control system is configured to monitor and measure an amount of exhaust air flowing through said exhaust duct to maintain a desired air pressure.

14. The HVAC system of claim 13 further comprising a damper positioned in the exhaust duct, wherein the control system is further configured to adjust the damper to control the amount of exhaust air flowing through said exhaust duct.

15. The HVAC system of claim 7, wherein both the terminal end of the first duct and the terminal end of the second duct are located in a mixing box.

16. The HVAC system of claim 15, wherein the mixing box defines an expanding cross-sectional area from a top portion thereof.

17. The HVAC system of claim 16, wherein the mixing box is adapted to blend the ventilation air and the conditioned air that has been heated or cooled.

18. The HVAC system of claim 7, wherein the first duct is configured to enter into the second duct prior to a termination point of either the first duct or the second duct.

19. The HVAC system of claim 7, wherein the control system is further configured to provide a third mixture of ventilation air and conditioned air to a third distinct space of the plurality of distinct spaces, wherein the third mixture of ventilation air and conditioned air comprises a different ratio of ventilation air and conditioned air than the first mixture and the second mixture.

20. An HVAC system, the HVAC system comprising:
an air inlet to an HVAC system, wherein the inlet provides the HVAC system with ventilation air comprising filtered air, wherein the ventilation air has a first temperature and a first humidity;
a singular air handler configured to provide conditioned air;
a plurality of diffusers to provide air to a plurality of distinct spaces inside a building, wherein each of the plurality of diffusers includes:
a first duct adapted to provide the ventilation air to one of the plurality of distinct spaces, and having a first diameter and a first terminal end; and
a second duct adapted to provide the conditioned air that has been heated or cooled by the singular air handler to one of the plurality of distinct spaces, and having a second diameter and a second terminal end, wherein the conditioned air has a second temperature and a second humidity, and wherein the first temperature differs from the second temperature and the first humidity differs from the second humidity;
wherein the first diameter of the first duct is smaller than the second diameter of the second duct, wherein the first duct extends through an opening in the second duct and bends downwardly to extend concentrically within the second duct, and wherein the terminal end of the first duct and the second duct is located within a mixing box adapted to blend the ventilation air and the conditioned air and provide a homogenous blend of the ventilation air and the conditioned air to one of the distinct spaces, and wherein the second terminal end of the second duct is located proximal a top of the mixing box and the first terminal end of the first duct is located between the second terminal end and at least an inch or more above a bottom of the mixing box to thereby prevent backflow, and
a control system configured to provide a first distinct space of the plurality of distinct spaces with a first mixture of ventilation air and conditioned air via a first diffuser of the plurality of diffusers and a second distinct space of the plurality of distinct spaces with a second mixture of ventilation air and conditioned air via a second diffuser of the plurality of diffusers simultaneously,
wherein the first mixture of ventilation air and conditioned air provided to the first distinct space via the first diffuser of the plurality of diffusers and the second mixture of ventilation air and conditioned air provided to the second distinct space via the second diffusers of the plurality of diffuser comprise different ratios of ventilation air and conditioned air,
wherein the mixing box defines an expanding cross-sectional area from the top thereof and includes a lower opening which is at least partially covered by a plate,
wherein the mixing box includes a lower opening which is at least partially cover by a plate,
wherein each diffuser of the plurality of diffusers is configured to emit the homogenous air into each space of the plurality of spaces in a horizontal and radial manner, and
wherein the first duct further includes a third diameter before extending into the opening of the second duct, wherein the third diameter is larger than the first diameter.

* * * * *